Jan. 6, 1931. J. H. ELLIOTT ET AL 1,787,617
GASOLINE LOCOMOTIVE
Filed May 27, 1929 9 Sheets-Sheet 6
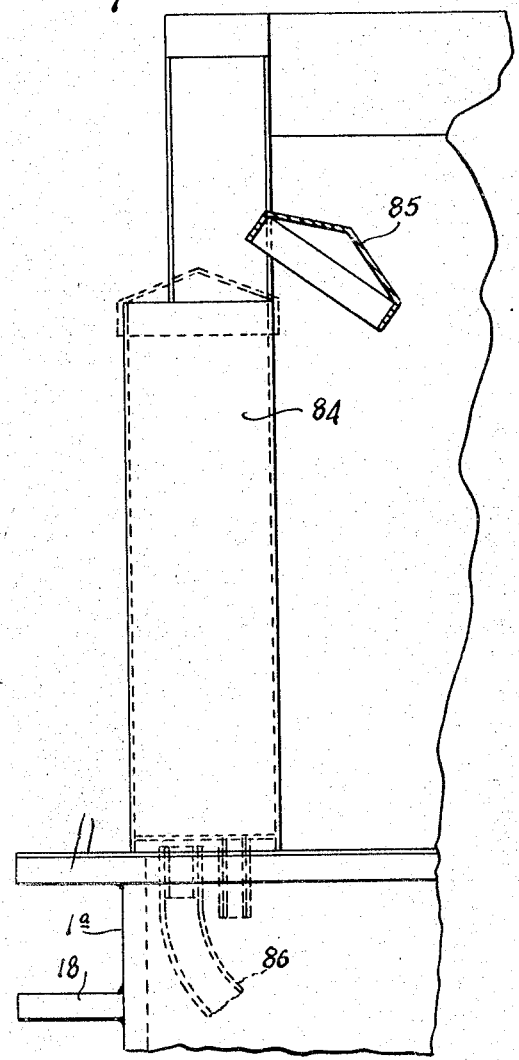
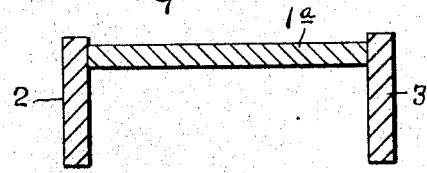
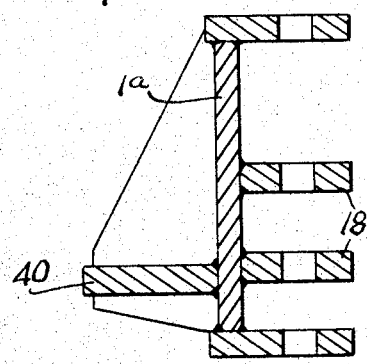
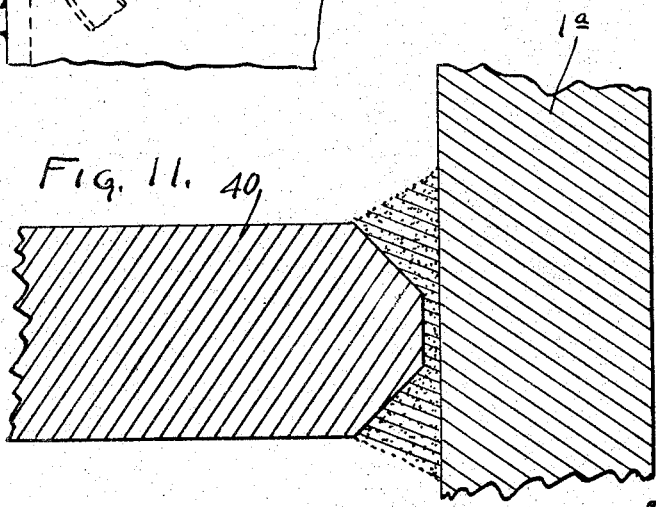
Inventors
JOSEPH H. ELLIOTT,
RAGNAR A. NORBOM,
Attorneys

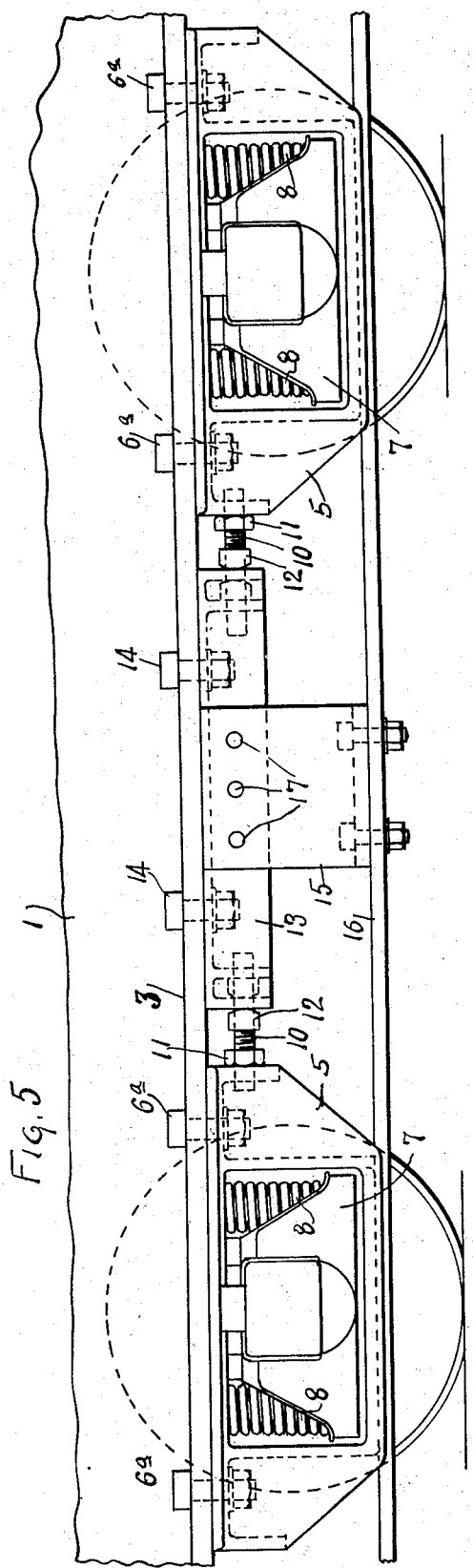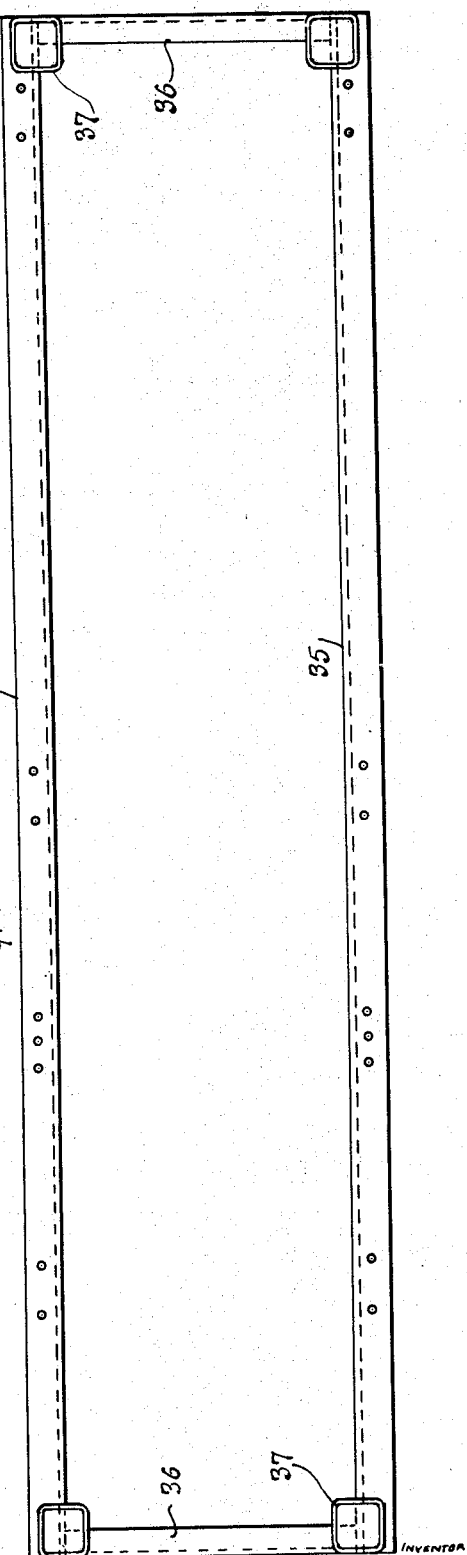

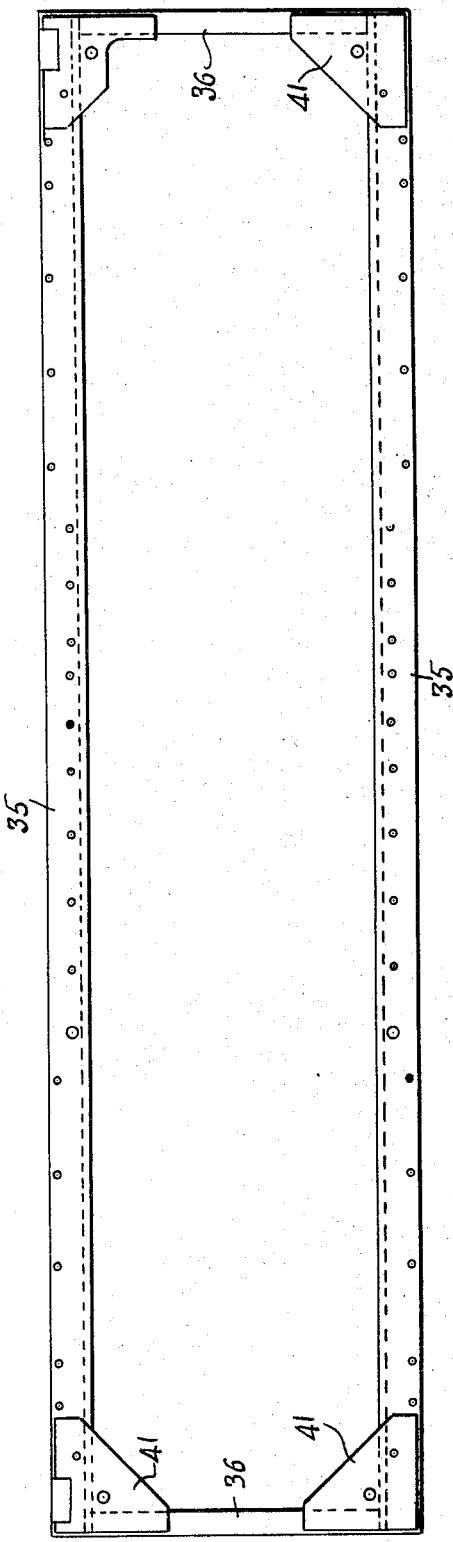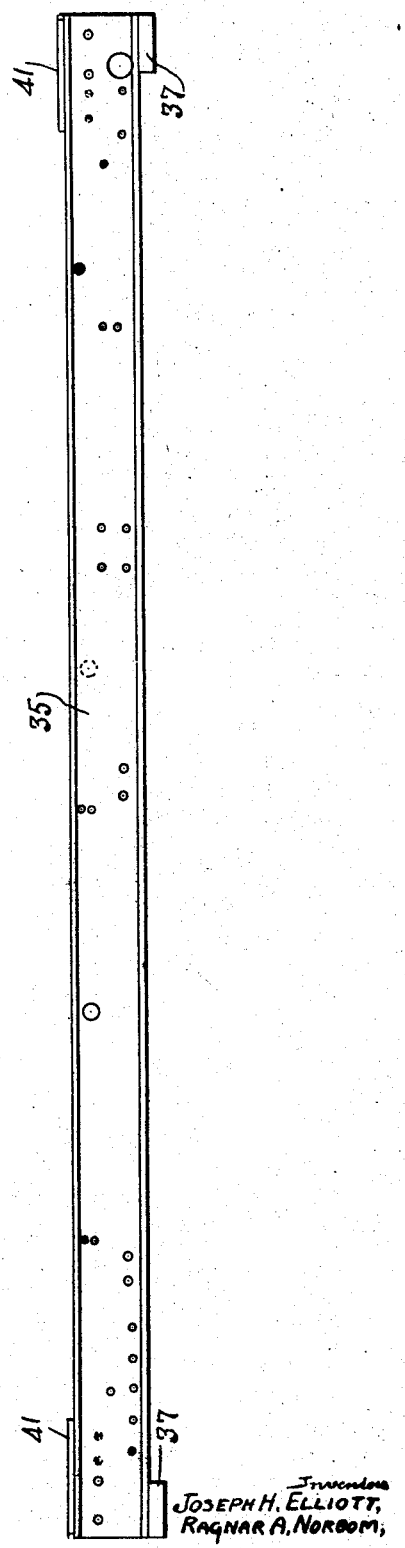

Jan. 6, 1931. J. H. ELLIOTT ET AL 1,787,617
GASOLINE LOCOMOTIVE
Filed May 27, 1929 9 Sheets-Sheet 8
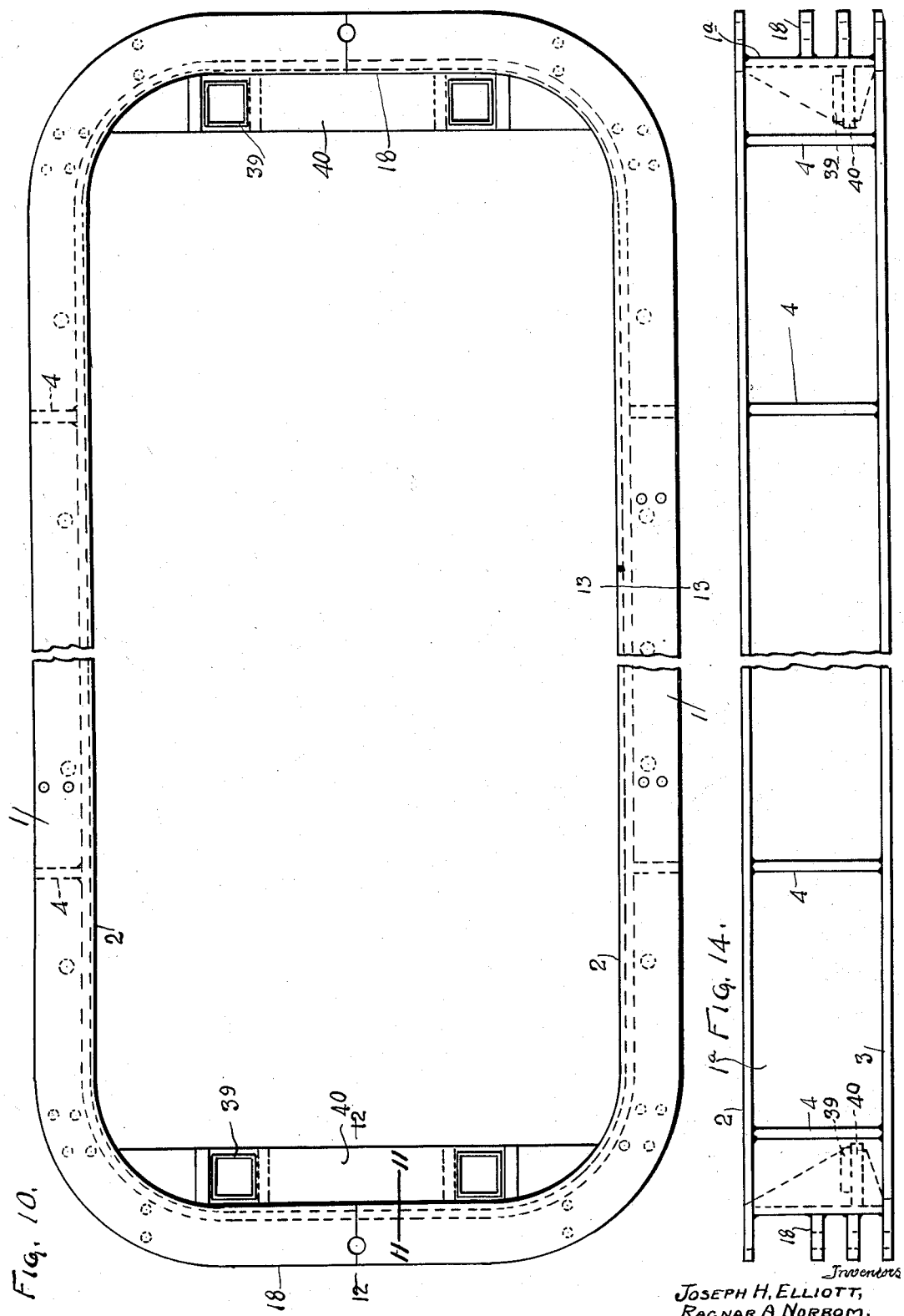
Inventors
JOSEPH H. ELLIOTT,
RAGNAR A. NORBOM,

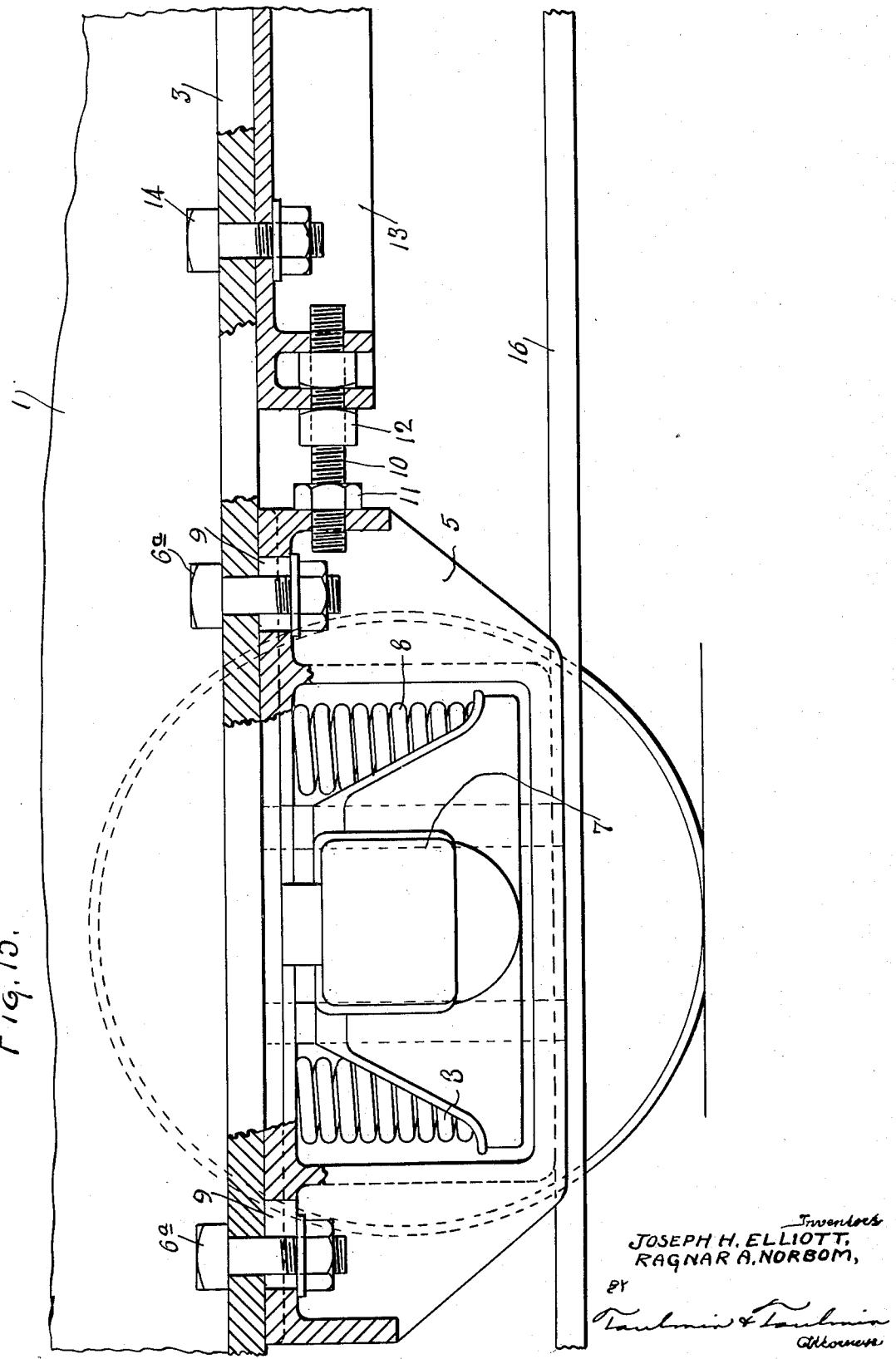

Patented Jan. 6, 1931

1,787,617

UNITED STATES PATENT OFFICE

JOSEPH H. ELLIOTT AND RAGNAR A. NORBOM, OF CINCINNATI, OHIO, ASSIGNORS TO THE CINCINNATI CAR CORPORATION, OF CINCINNATI, OHIO, A CORPORATION OF OHIO

GASOLINE LOCOMOTIVE

Application filed May 27, 1929. Serial No. 366,243.

This invention relates to locomotives and particularly to internal combustion engine, industrial locomotives.

It is an object of our invention to provide a motive power unit having an outside general frame mounted on the truck and inside separate power plant frame yieldingly connected to the general frame but not subject to the twisting strains and jolts suffered by the general frame which are severe in the switching and hauling work of an industrial locomotive.

It is a further object to provide an industrial locomotive with a centrally located cab and control system, particularly the coupling and uncoupling controls so that the operator is in an equidistant position from either end of the locomotive in order that his coupling can be effective from the interior of the cab as easily at one end of the locomotive as at the other.

It is a further object to provide such a locomotive with a center cab, a power plant at one end and the fuel supply at the other, so as to balance and distribute the weight on the power plant frame in vew of the fact that it is a floating frame.

It is a further object to provide sand boxes which can be filled from the outside of the locomotive without entering the cab, such sand boxes being arranged to feed the sand in any desired manner.

It is a further object to provide a general frame adjustably mounted with respect to the journal boxes of the axles so as to accommodate the slack in the driving chains that transmit the power from the power plant to the wheels.

It is a further object to distribute power from the engine to the wheels at either ends of the general frame and to provide a coupling between the clutch shaft and the transmission shaft with a removable section, which, when removed, gives access to the clutch shaft, but which may be drawn longitudinally in a manner to open up the clutch plates so that they can be removed for renewals.

Referring to the drawings:—

Fig. 5 is a detail elevation showing the adjusting mechanism of the journal boxes and axles with respect to the general frame;

Fig. 6 is a detail view of the sand box;

Fig. 7 is a bottom plan view of the frame on which the power plant is mounted;

Fig. 8 is a side elevation thereof;

Fig. 9 is a top plan view thereof;

Fig. 10 is a top plan view of the general frame showing the supports for the rubber cushions that in turn support the power plant frame;

Fig. 11 is a section on the line 11—11 of Fig. 10;

Fig. 12 is a section on the line 12—12 of Fig. 10;

Fig. 13 is a section on the line 13—13 of Fig. 10;

Fig. 14 is a side elevation in detail of the general frame;

Fig. 15 is a vertical section on the line 15—15 of Fig. 3 showing in detail the adjusting mechanism for adjusting the journal boxes and axles with respect to the general frame.

Figure 1:
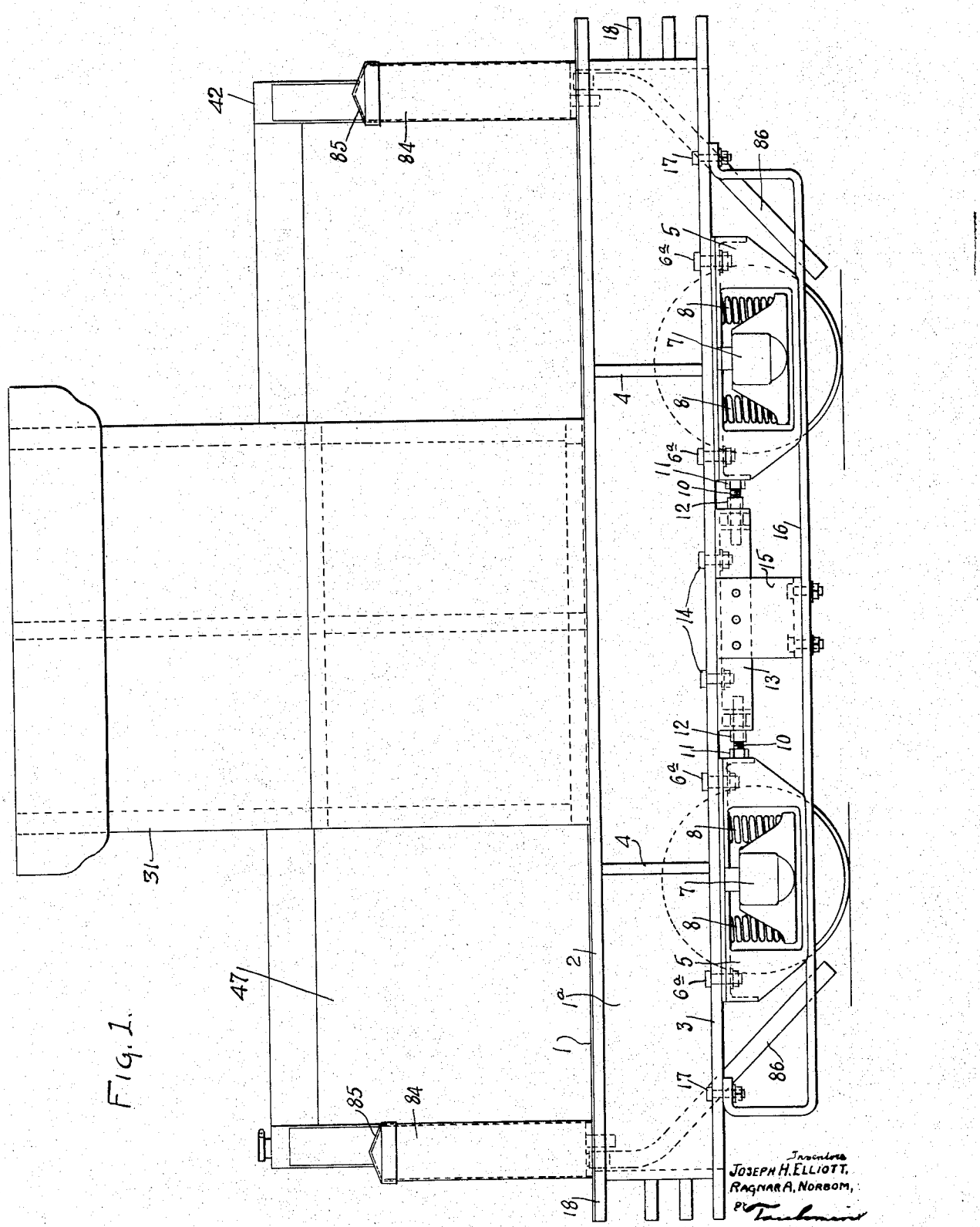
Fig. 1 is a side elevation of the complete locomotive.
Figure 2:
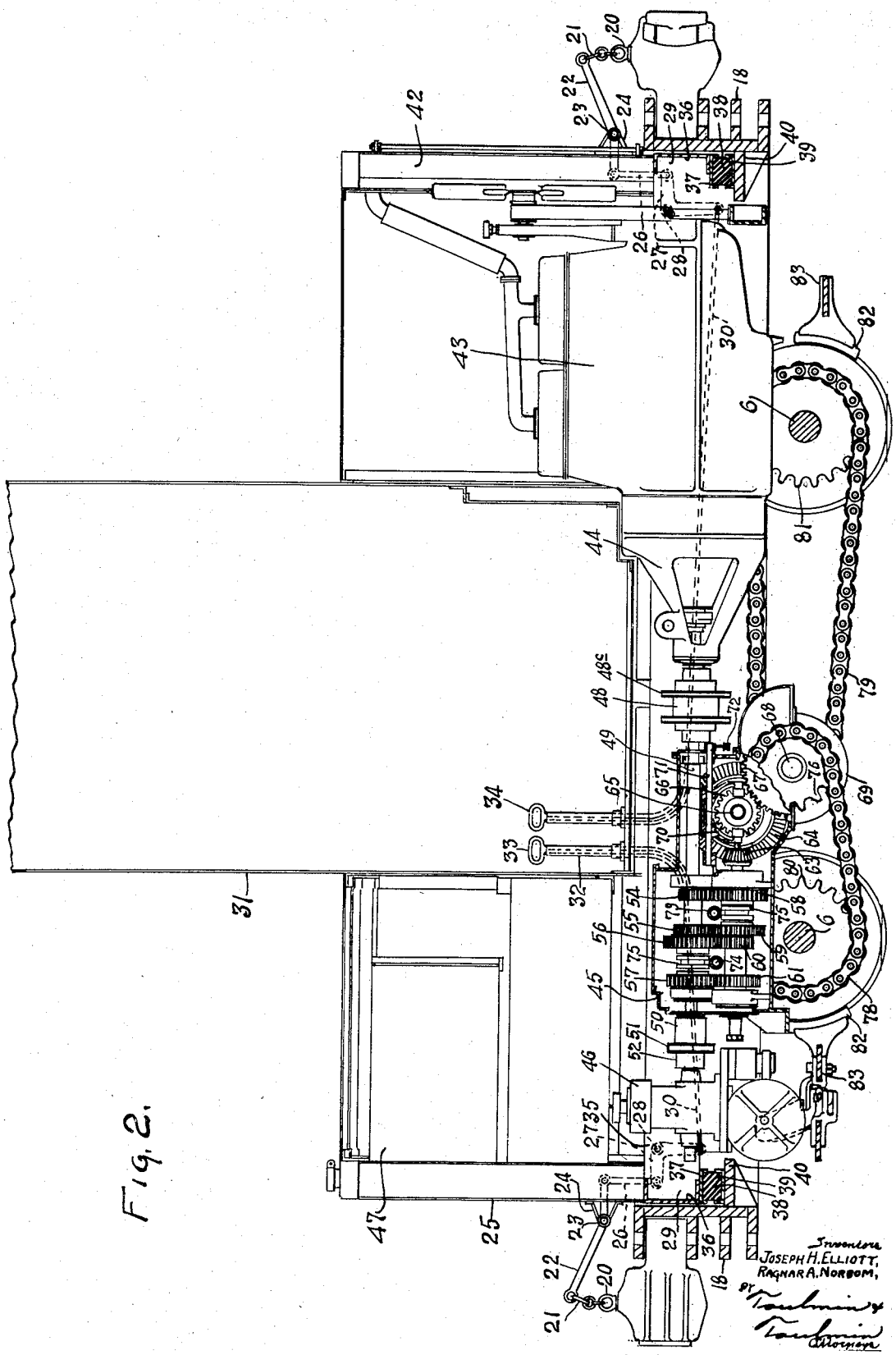
Fig. 2 is a vertical section therethrough.
Figure 3:
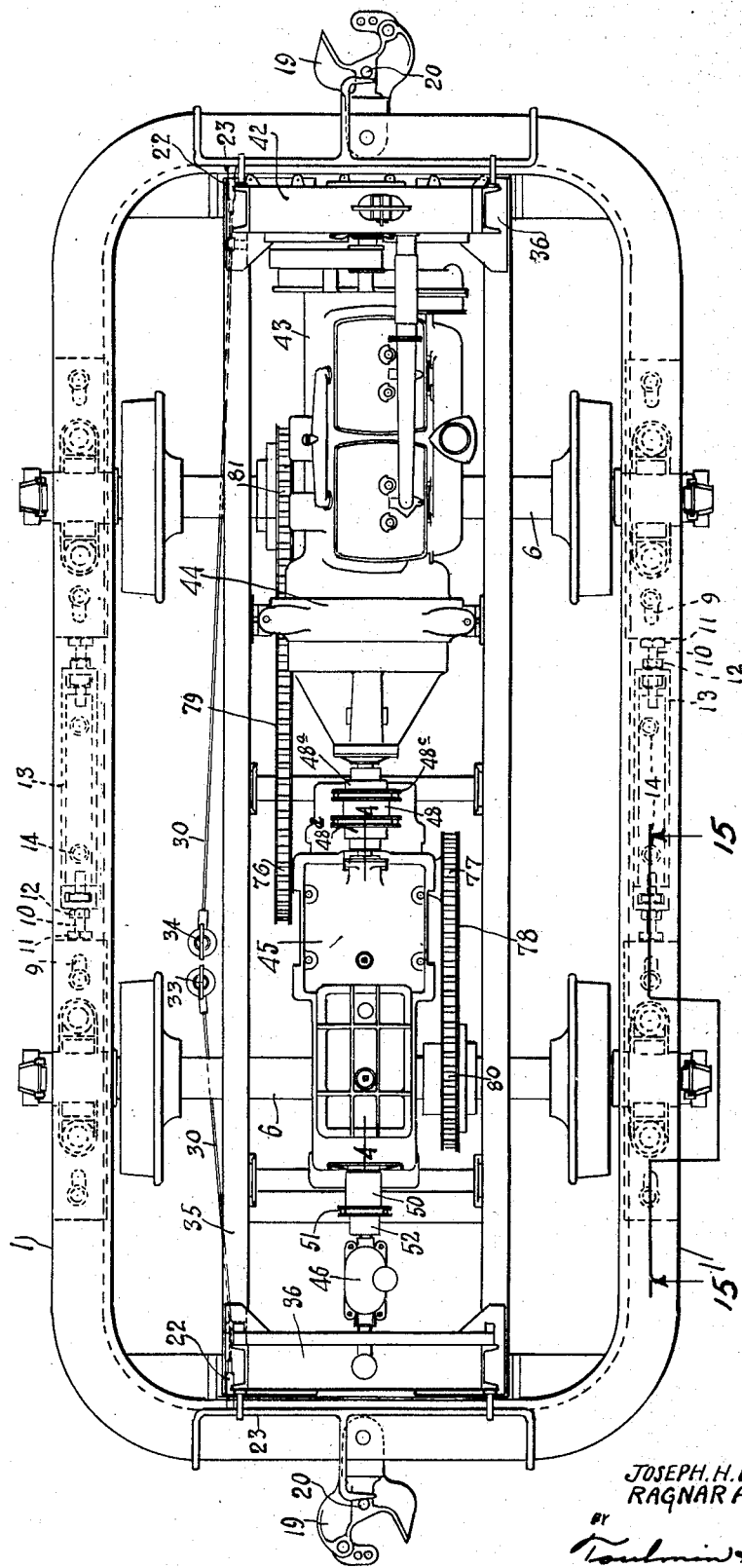
Fig. 3 is a top plan view with the ends and cab removed.
Figure 4:
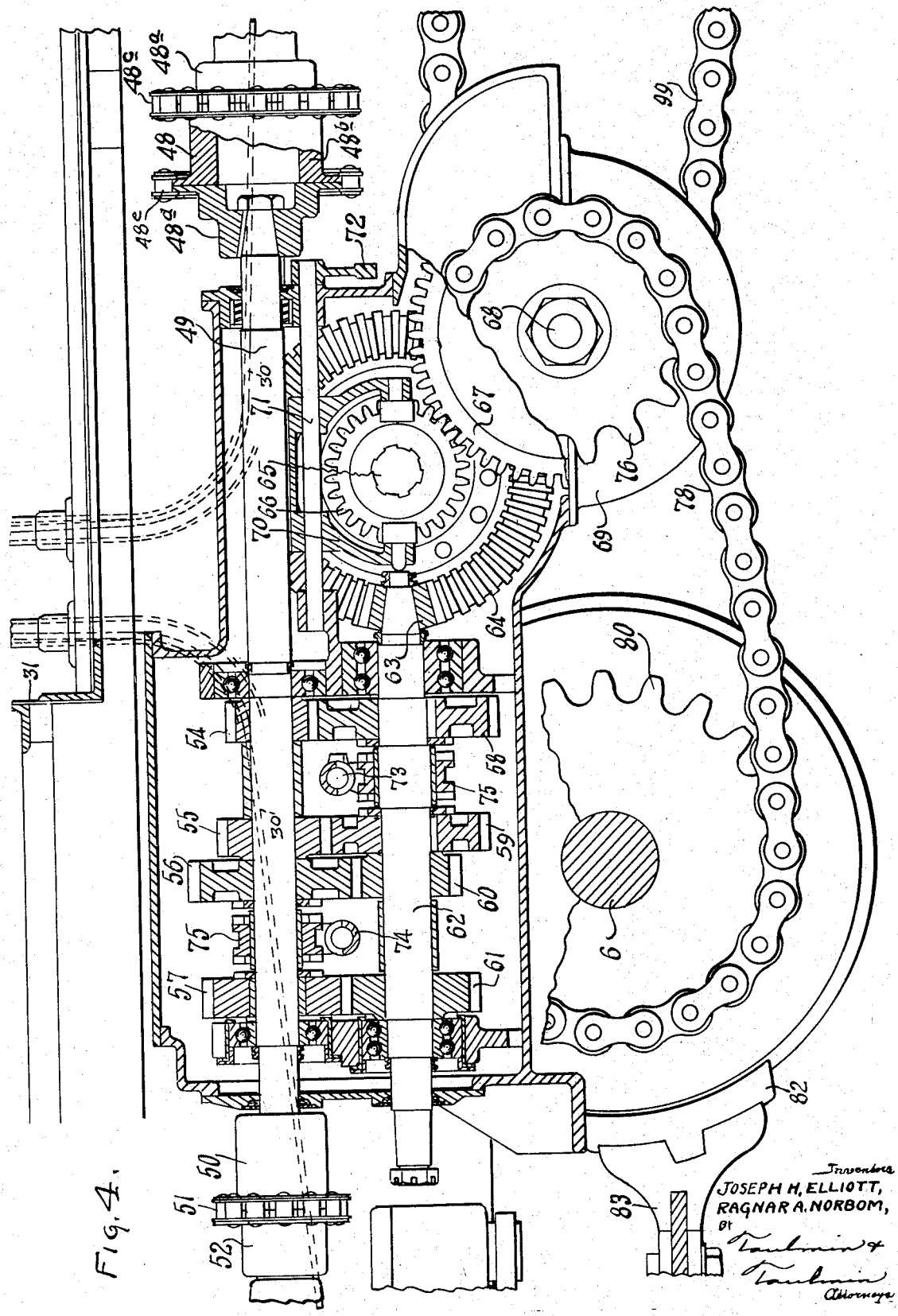
Fig. 4 is a section on the line 4—4 of Fig. 3.

Referring to the drawings in detail, 1 is a general frame completely surrounding the locomotive. It is formed of a vertically disposed annular plate 1a and top and bottom 2 and 3 welded thereto. At intervals the ribs 4 are welded to the structure to give greater strength.

This general frame is mounted through adjustable brackets 5 upon axles 6, the ends of which are carried in journal boxes 7. Springs 8 are interposed between the journal boxes and the frame 5. These frames 5 are connected by bolts 6a to the plate 3 of the general frame. Such bolts are mounted in slots 9. To one side of frame 5 is attached a bolt 10 having lock nut 11 and operating nut 12 thereon. Such bolt is threaded within the bracket 13 that is suspended beneath the plate 3 by the bolts 14.

The bracket 13 being stationary serves as an abutment against which threaded bolt 10 can work to shift the position of frame 5 in order to take up any slack in the driving chains connected to the axles.

The depending side plates 15 are connected to the bracket 13 and also the frame supporting guard 16 which passes beneath the frame 5 and acts as a slidable support therefor. This guard 16 is attached by bolt 17 at either end to plate 3.

At either end of the general frame are laterally extending coupler plates 18 on which are mounted suitable couplers 19; the pins 20 of which are actuated as follows:

A link 21 is connected to a bell crank 22 pivoted at 23 on a bracket 24 mounted upon one end of the hood 25 of the locomotive. Such mounting may be either on the radiator end or on the gasoline tank end of the hood. The bell crank 22 is connected to the pitman 26 which in turn is connected to a bell crank 27, pivoted at 28 on the vertical wall 29 of the power plant frame. The bell crank 27 is connected to a flexible cable 30 which extends upwardly to a point within the cab 31 where it is guided by a sleeve 32. The handle 33 is connected to one of these cables and the handle 34 is connected to the other.

The power plant frame comprises side members 35 and end members 36 on the corners of which are depending square housings 37 for receiving upper ends of the resilient supporting blocks 38.

The lower sides of these blocks are received within a similar box 39 supported upon a bracket 40 which is welded to the inside of the ends of the general frame. Thus the power plant frame is resiliently supported upon its four corners within, but in spaced relationship to the general frame. Shocks, jars and twisting of the general frame will not be imparted to the power plant frame.

The corners of the power plant frame are reenforced on the top by angle plates 41.

This power plant frame is made very much narrower than the general frame. By making this frame narrower the complete power plant equipment can be assembled and mounted on the main frame or removed in order that a new power plant and frame can be substituted, thus facilitating repairs and retaining the locomotive in operation without the necessity of removing the heavy main running gear from the track.

The power plant frame has mounted thereon the radiator 42, the engine 43, the clutch 44 having clutch plates, the transmission gearing and gear box 45 and the air compressor 46, together with the cab 31 and the fuel tank 47.

The power plant 43 drives through the coupling housing 48 the driving transmission shaft 49. This coupling consists of a cup 48a connected to an intermediate housing 48b by bolts 48c. Another cup 48d is connected by bolts 48e to the housing 48b. On the other side it is connected to the transmission driving shaft 49.

The other end of shaft 49 is likewise connected to a connecting housing 50 to which is bolted by bolt 51 a housing 52 which in turn is connected to the shaft of the compressor.

These couplings 48 and 50 are flexible and permit the necessary adjustments.

The gears 54, 55, 56 and 57 which are mounted on the driving shaft 49 suitably engage the driven gears 58, 59, 60 and 61 carried on the driven shaft 62, one end of which carries the bevel pinion 63 between the driving gears 64 that are loosely mounted on the shaft 65. The shaft 65 has slidably mounted thereon between the gears 64 and turning therewith gear 66 which engages the gear 67 mounted on the shaft 68, which is journaled in the housing 69. Between the hub of the gear 66 and the gear 64 are clutch mechanisms. The shifting yoke 70 carried on the shaft 71 and operated from the bell crank 72 shifts the gear 66 so that it clutches with one of the respective gears 64 and so determines the direction of motion of the locomotive. The reversing lever is designated 73. The gear shift lever is designated 74. It operates through clutch sleeve 75 in the usual manner.

The shaft 68 has mounted thereon at either end sprockets 76 and 77 which are connected to chains 78 and 79 that drive the sprockets 80 and 81 on the respective axles.

The brake shoe 82 is operated by any convenient brake rigging 83, such brake equipment being operated in the usual manner from the cab.

By our method of coupling between the clutch shaft and the transmission shaft with the removable section 48 we are enabled to secure access to the clutch shaft which may be withdrawn longitudinally in a manner to open up the clutch plates so that they can be removed for renewals.

The sand boxes 84 have filter caps 85; they are located completely outside of the housing on the power frame to supply sand through the pipes 86.

It will be understood that we desire to comprehend within our invention and within the scope of our claims such modifications as may be fairly comprehended within such claims and invention due to necessary modifications to adapt our invention to varying conditions of use and to varying purposes.

Having thus fully described our invention, what we claim as new and desire to secure by Letters Patent is:

1. In combination in a locomotive, a main frame having transverse end brackets, a supplementary frame spaced therefrom and yielding means for supporting said supplementary frame upon the brackets but spaced from the main frame.

2. In combination in a locomotive, a main frame having transverse end brackets, a supplementary frame located within said main frame, but spaced therefrom and yielding means for supporting said supplementary frame within said main frame on said brackets adjustably and yieldably thereof.

3. In a locomotive the combination of a main frame having substantial depth carrying a running gear and coupling devices, transverse brackets on the inside of the end of said main frame, a supplementary frame mounted on said brackets, and yielding means between said frames.

4. In a locomotive the combination of a main frame having substantial depth carrying a running gear and coupling devices, transverse brackets on the inside of the end of said main frame, a supplementary frame mounted on said brackets and yielding means between said frames, said yielding means being located at the corners of the supplementary frame.

5. In a locomotive the combination of a main frame having substantial depth carrying a running gear and coupling devices, transverse brackets on the inside of the end of said main frame, a supplementary frame mounted on said brackets and yielding means between said frames, said yielding means being located at the corners of the supplementary frame and said yielding means comprising rubber blocks.

6. In combination in a locomotive, a main frame, an interiorly located, spaced supplementary frame, spaced, superimposed retaining boxes mounted on said respective frames and rubber blocks mounted in said boxes adapted to hold said frames yieldingly apart from one another in a relative position.

7. In combination, a main frame, a supplementary frame yieldingly mounted in spaced relationship to the main frame, a power plant on the supplementary frame, running gear mounted on the main frame driven by said power plant, means for driving said running gear from the power plant and means to adjust the position of the running gear with respect to the main frame in order to adjust the relationship between the power plant, its driving mechanism and said running gear.

8. In a locomotive, a main frame having coupling devices, a running gear supporting said main frame, an interiorly disposed, spaced supplementary frame, yielding means interposed between the supplementary frame and the main frame, a power plant and fuel supply mounted on opposite ends of said supplementary frame, an operator's cab located therebetween and means connecting said power plant to said running gear for driving the locomotive.

9. In a locomotive, a main frame having coupling devices, a running gear supporting said main frame, an interiorly disposed, spaced supplementary frame, yielding means interposed between the supplementary frame and the main frame, a power plant and fuel supply mounted on opposite ends of said supplementary frame, an operator's cab located therebetween, means connecting said power plant to said running gear for driving the locomotive and means located adjacent the operator on the supplementary frame for controlling the coupling devices on the main frame.

10. In combination in the locomotive, a main frame carrying coupling devices, a running gear therein, an interiorly disposed, yielding support, supplementary power plant frame, a power plant transmission mechanism and fuel supply with an operator's cab mounted on said supplementary frame and means for connecting said transmission mechanism to said running gear.

11. In combination in the locomotive, a main frame carrying coupling devices, a running gear therein, an interiorly disposed, yielding support, supplementary power plant frame, a power plant transmission mechanism and fuel supply with an operator's cab mounted on said supplementary frame and means for connecting said transmission mechanism to said running gear, said means being located at one end of the power plant frame, the fuel tank at the other, the operator's cab in between and the transmission mechanism below said cab close to adjacent running gear.

12. In combination in the locomotive, a main frame carrying coupling devices, a running gear therein, an interiorly disposed, yielding support, supplementary power plant frame, a power plant transmission mechanism and fuel supply with an operator's cab mounted on said supplementary frame and means for connecting said transmission mechanism to said running gear, said means being located at one end of the power plant frame, the fuel tank at the other, the operator's cab in between and the transmission mechanism below said cab close to adjacent running gear, coupling device on either end of main frame and controls therefor extending into said operator's cab on the supplementary frame.

13. In a locomotive, a main frame having coupling devices, a running gear on the main frame, a supplementary frame carrying a power plant transmission gearing, an air compressor, fuel supply tank and an operator's cab.

14. In a locomotive, a main frame having coupling devices, a running gear on the main frame, a supplementary frame carrying a power plant transmission gearing, an air compressor, a fuel supply tank, an operator's cab, means in said operator's cab to control said coupling devices and said transmission mechanism, and means for driving said running gear from said transmission mechanism.

15. A main frame having transverse end brackets, a supplementary frame mounted thereon in spaced yielding relationship, a power plant at one end of the supplementary frame, an intermediate transmission mechanism, driving sprockets connected thereto, chains on said sprockets, a running gear connected to said main frame and means on said running gear for receiving said driving chains.

16. A main frame having transverse end brackets, a supplementary frame mounted on said brackets in spaced yielding relationship to the main frame, a power plant at one end of the supplementary frame, an intermediate transmission mechanism, driving sprockets connected thereto, chains on said sprockets, a running gear connected to said main frame, means on said running gear for receiving said driving chains and means to adjust said running gear of the main frame to take up the slack in said chains.

17. In combination, a main frame having transverse end brackets, a supplementary frame mounted on said brackets, a power plant, chain speed mechanism, power transmission mechanism for conveying power in opposite directions, a running gear mounted on said main frame, means for connecting the axle of said running gear respectively to said power mechanism for driving in opposite directions, means for shifting said power mechanism, and yielding means interposed between said main frame and supplementary frame.

18. In combination, a main frame, a supplementary frame thereon, a power plant, change speed mechanism, power transmission mechanism for conveying power in opposite directions, a running gear mounted on said main frame, means for connecting the axle of said running gear respectively to said power mechanism for driving in opposite directions, means for shifting said power mechanism, yielding means interposed between said main frame and supplementary frame, and means to adjust the positioning of the running gear with respect to the main frame.

19. In a locomotive, a main frame, a supplementary frame, a power plant, a clutch and clutch shaft, a transmission shaft and air compressor located in alignment, running gear for said main frame and chains driven by said transmission shaft connected to the respective axles of the running gear for driving said axle in opposite direction alternatively and means to alternatively connect said axles to said transmission shaft.

20. In combination, a main frame, a running gear therefor, a supplementary frame within said main frame, a power plant transmission mechanism and air compressor within said supplementary frame, a cab, fuel supply tank, and a radiator mounted upon said supplementary frame above the other mechanism carried by this supplementary frame.

21. In combination, a main frame having transverse end brackets, a supplementary frame spaced therefrom upon said transverse brackets, and intermediate means to permit movement in all directions between said frames.

In testimony whereof, we affix our signatures.

JOSEPH H. ELLIOTT.
RAGNAR A. NORBOM.